United States Patent
Lee et al.

(10) Patent No.: US 10,067,607 B2
(45) Date of Patent: Sep. 4, 2018

(54) TIME DOMAIN REFLECTOMETRY TOUCH WINDOW SENSOR

(71) Applicant: LG INNOTEK CO., LTD., Seoul (KR)

(72) Inventors: Sang Young Lee, Seoul (KR); Tae Jin Lee, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 0 days.

(21) Appl. No.: 15/112,091

(22) PCT Filed: Dec. 26, 2014

(86) PCT No.: PCT/KR2014/012927
§ 371 (c)(1),
(2) Date: Jul. 15, 2016

(87) PCT Pub. No.: WO2015/108290
PCT Pub. Date: Jul. 23, 2015

(65) Prior Publication Data
US 2016/0378256 A1    Dec. 29, 2016

(30) Foreign Application Priority Data

Jan. 17, 2014 (KR) .................. 10-2014-0006339
Feb. 5, 2014 (KR) .................. 10-2014-0013000
(Continued)

(51) Int. Cl.
*G06F 3/041* (2006.01)
*G06F 1/16* (2006.01)
*G06F 3/044* (2006.01)

(52) U.S. Cl.
CPC .......... *G06F 3/0418* (2013.01); *G06F 1/1692* (2013.01); *G06F 3/041* (2013.01);
(Continued)

(58) Field of Classification Search
CPC ...... G06F 3/041; G06F 3/0412; G06F 3/0414; G06F 3/0418; G06F 3/044;
(Continued)

(56) References Cited

U.S. PATENT DOCUMENTS 5,149,918 A * 9/1992 Kozik .................. G06F 3/0414
178/18.05
7,874,666 B2    1/2011 Xu et al.
(Continued)

FOREIGN PATENT DOCUMENTS

KR    10-2005-0032134 A    4/2005
WO    WO 2011/137201 A2    11/2011

OTHER PUBLICATIONS

International Search Report issued in PCT/KR2014/012927, dated Mar. 25, 2015.

*Primary Examiner* — Alexander Eisen
*Assistant Examiner* — Nelson Lam
(74) *Attorney, Agent, or Firm* — Birch, Stewart, Kolasch & Birch, LLP

(57) ABSTRACT

A touch window includes a substrate, and a sensor part provided on the substrate and performing a sensing process through a time domain reflectometry. The sensor part includes a conductive pattern.

19 Claims, 18 Drawing Sheets

(30) Foreign Application Priority Data

Feb. 5, 2014 (KR) .................. 10-2014-0013001
Feb. 17, 2014 (KR) .................. 10-2014-0018128

(52) U.S. Cl.
CPC ............ G06F 3/044 (2013.01); G06F 3/0412 (2013.01); G06F 3/0414 (2013.01); *G06F 2203/04102* (2013.01); *G06F 2203/04104* (2013.01); *G06F 2203/04105* (2013.01); *G06F 2203/04106* (2013.01); *G06F 2203/04112* (2013.01)

(58) Field of Classification Search
CPC . G06F 2203/04102; G06F 2203/04104; G06F 2203/04106; G06F 2203/04112
USPC .................................................. 345/173–179
See application file for complete search history.

(56) References Cited

U.S. PATENT DOCUMENTS

| | | | |
|---|---|---|---|
| 8,467,270 B2 | 6/2013 | Gossweiler, III et al. | |
| 2004/0239616 A1* | 12/2004 | Collins | G06F 3/0202 345/156 |
| 2009/0013788 A1* | 1/2009 | Yamasaki | G06F 3/0202 73/627 |
| 2009/0295753 A1 | 12/2009 | King et al. | |
| 2011/0128257 A1 | 6/2011 | Kim | |
| 2011/0267287 A1 | 11/2011 | Bartling et al. | |
| 2012/0062510 A1* | 3/2012 | Mo | G06F 3/044 345/174 |
| 2012/0271580 A1 | 10/2012 | Bartling et al. | |
| 2012/0319974 A1* | 12/2012 | Kim | G06F 3/044 345/173 |
| 2013/0002610 A1* | 1/2013 | Ho | G06F 3/0414 345/175 |
| 2013/0083457 A1* | 4/2013 | Wurzel | G06F 11/3044 361/679.01 |
| 2013/0141316 A1 | 6/2013 | Lee et al. | |
| 2013/0187876 A1* | 7/2013 | Ishihara | G06F 3/044 345/173 |
| 2014/0132523 A1* | 5/2014 | Guard | G06F 3/041 345/173 |
| 2014/0253477 A1* | 9/2014 | Shim | G06F 3/0416 345/173 |
| 2016/0246393 A1* | 8/2016 | Lee | G06F 3/044 |
| 2016/0283006 A1* | 9/2016 | Ogura | G06F 3/0414 |
| 2017/0147144 A1* | 5/2017 | Lee | G06F 3/0418 |

* cited by examiner

[Fig. 1]
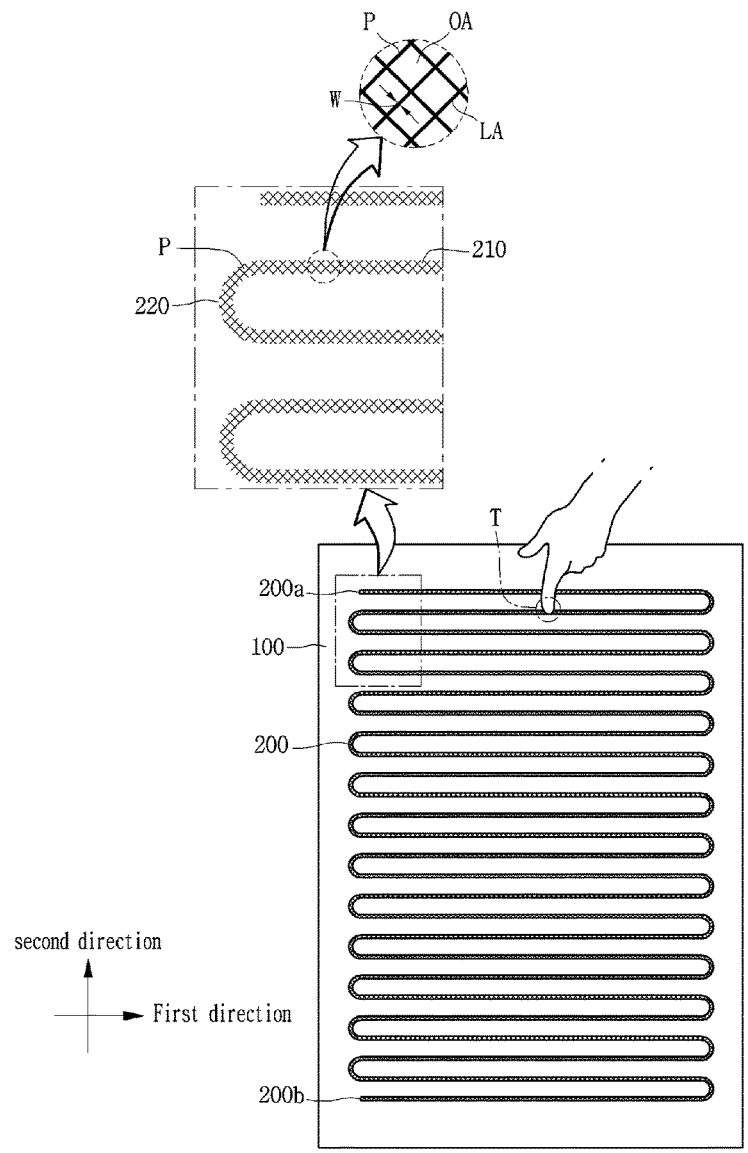
[Fig. 2]
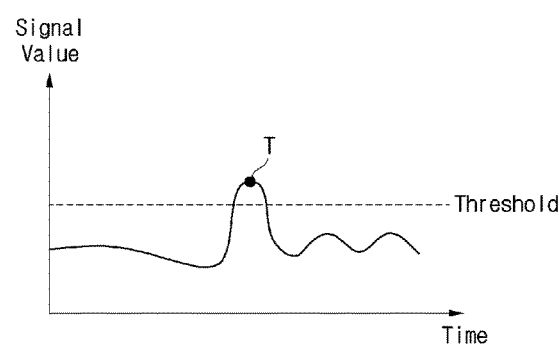

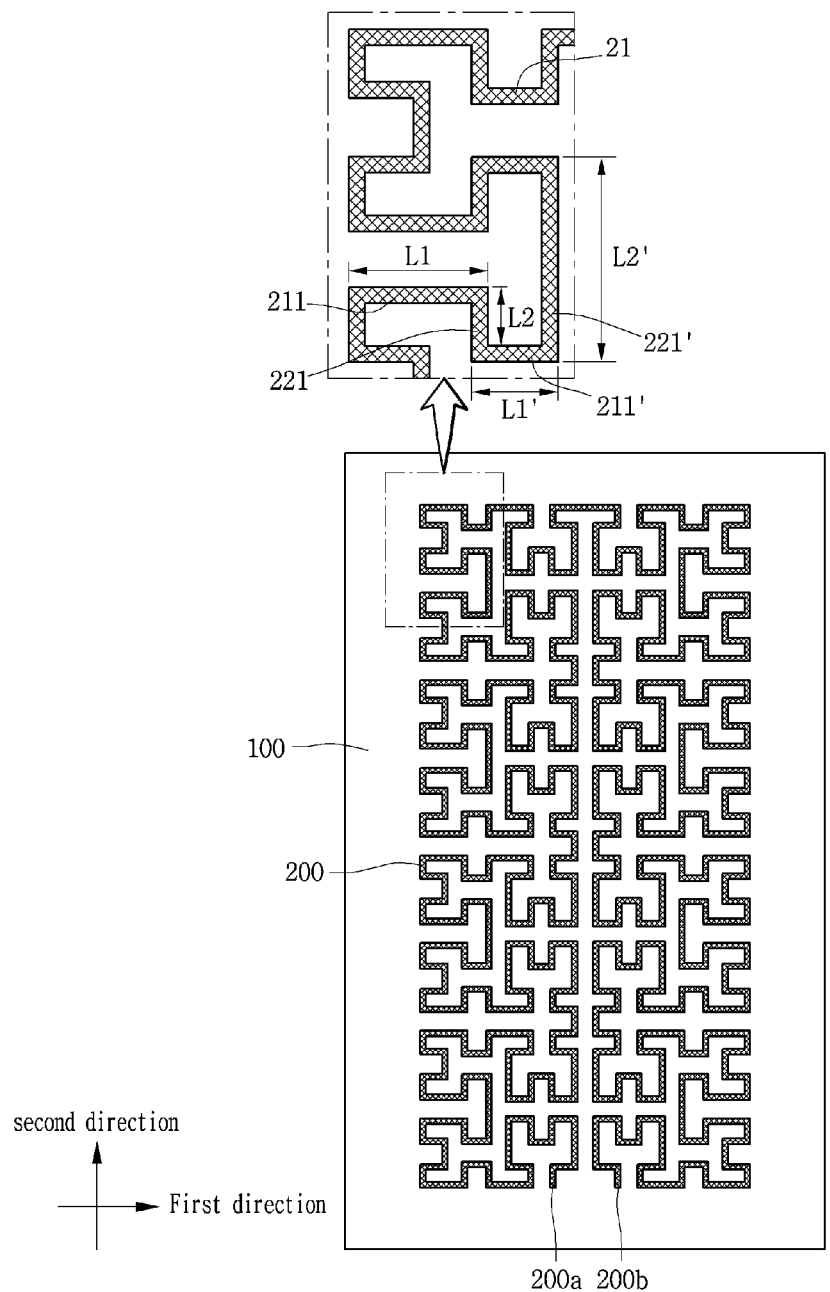
[Fig. 3]

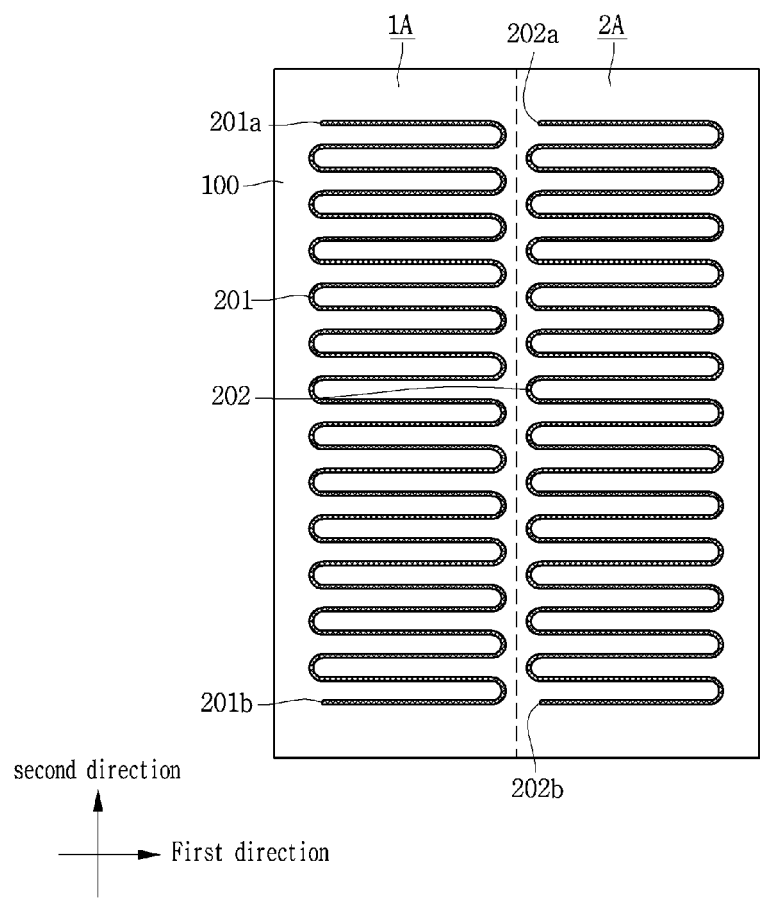
[Fig. 4]

[Fig. 5]
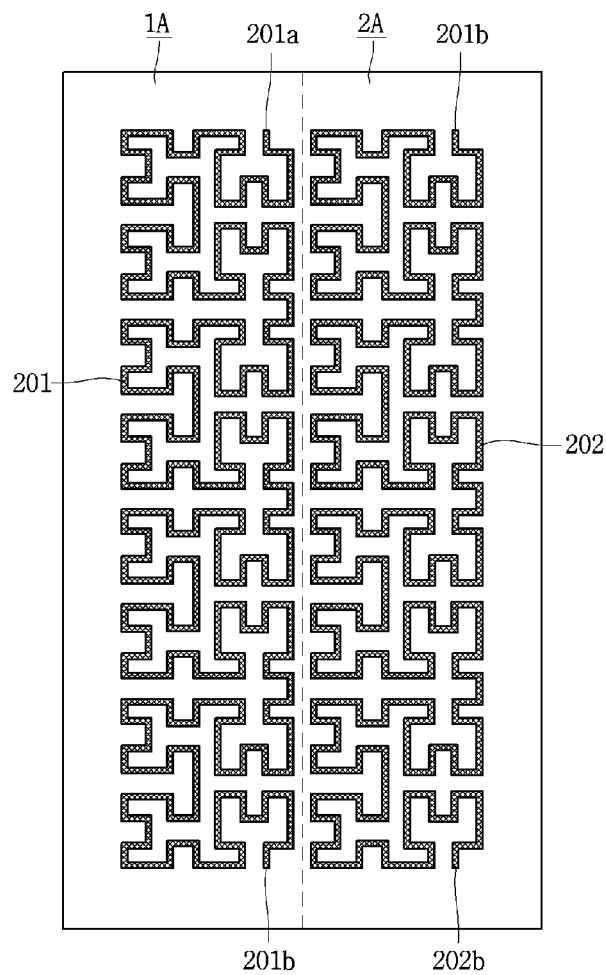

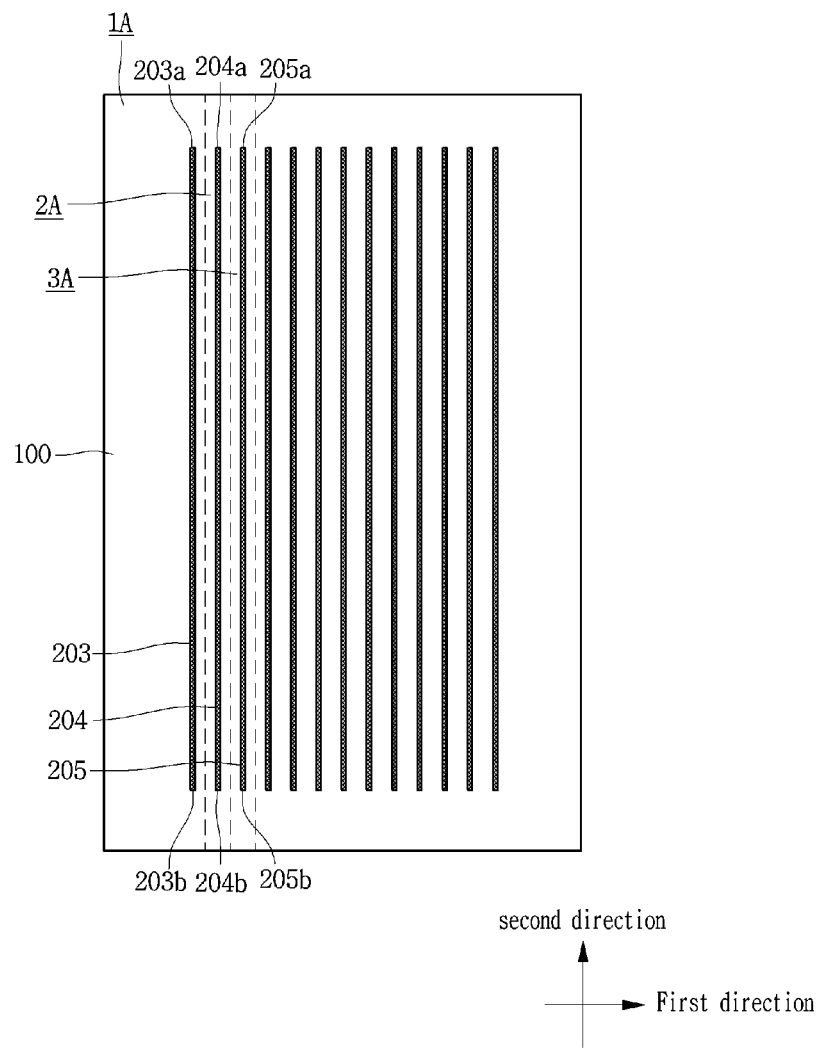
[Fig. 6]

[Fig. 7]
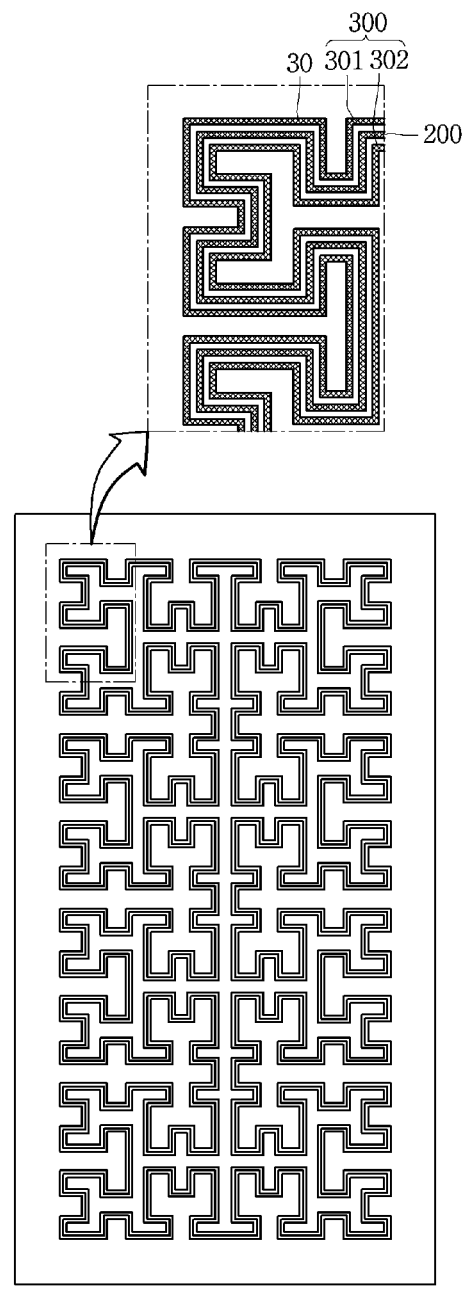

[Fig. 8]
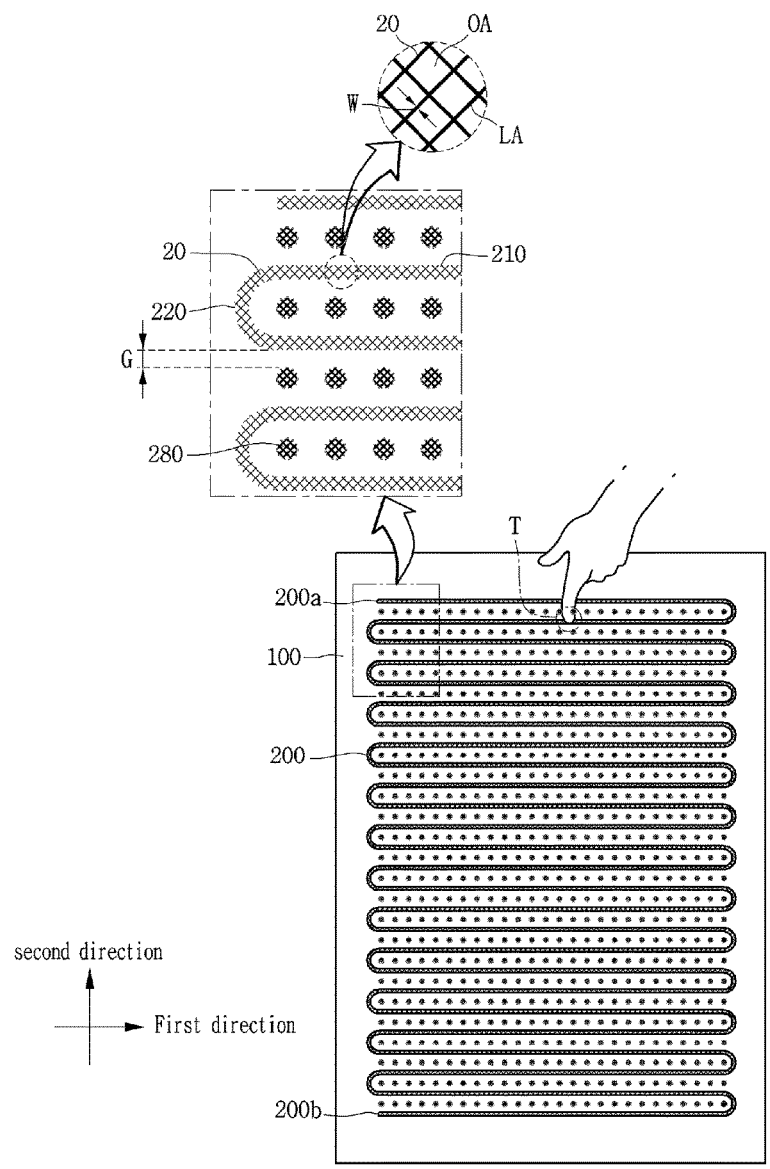

[Fig. 9]
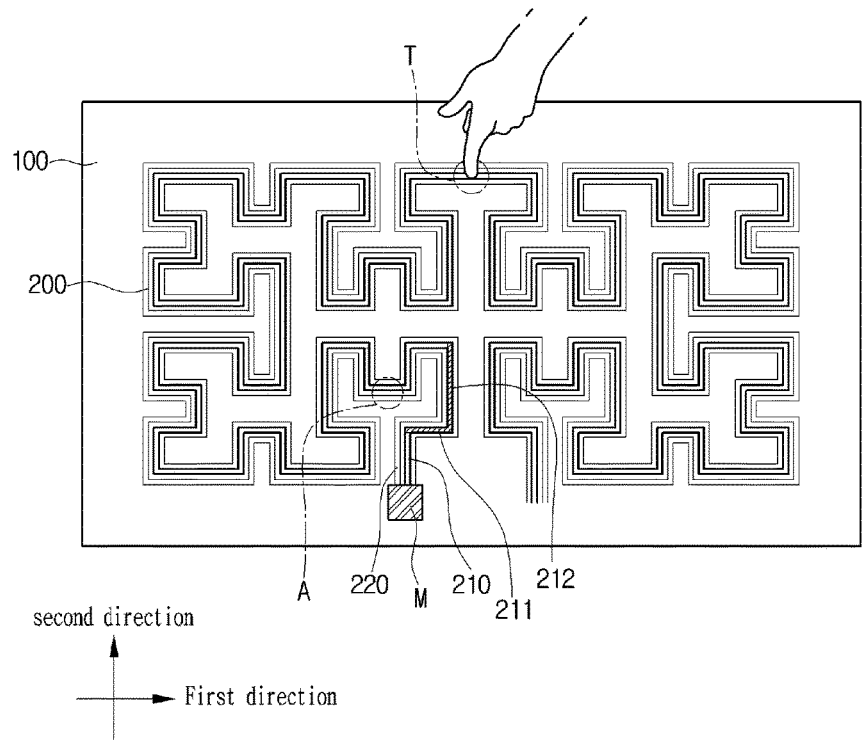
second direction
First direction
[Fig. 10]
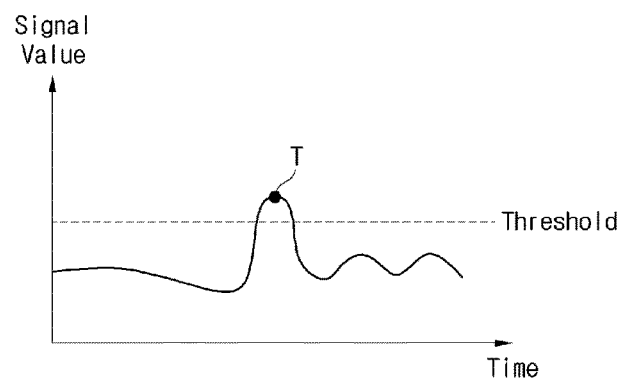

[Fig. 11]
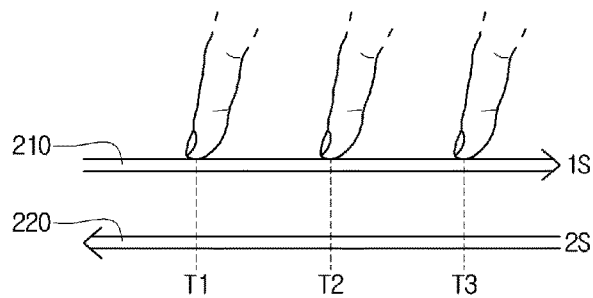
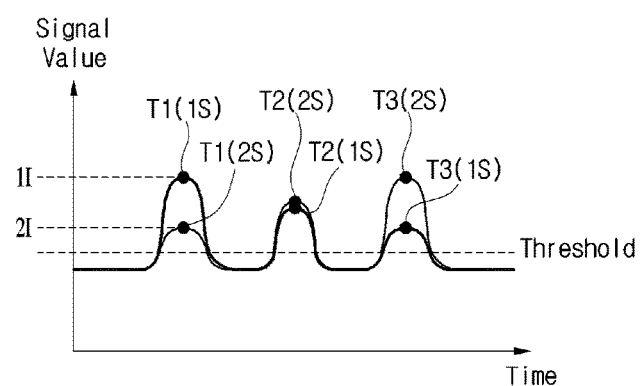
[Fig. 12]
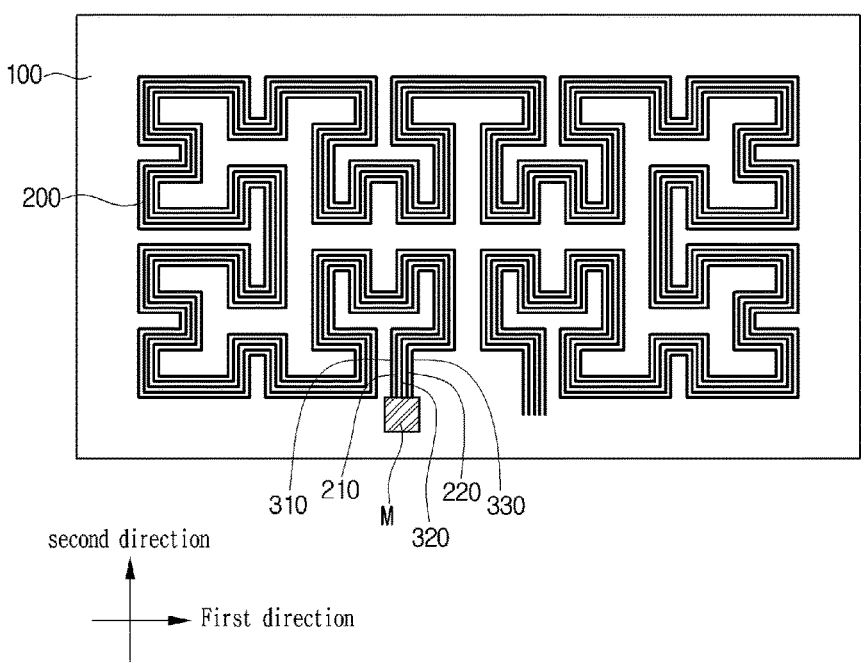

[Fig. 13]
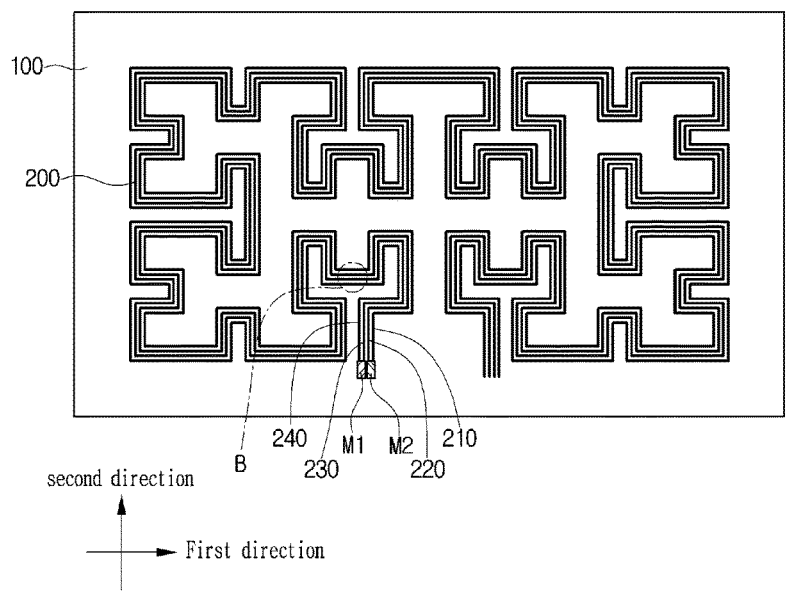
second direction
First direction
[Fig. 14]
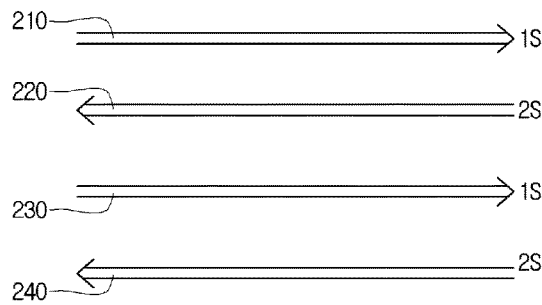
[Fig. 15]
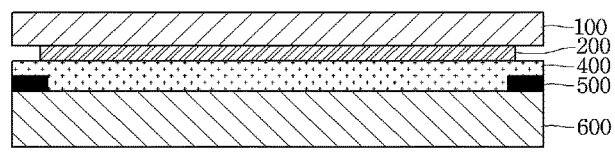
[Fig. 16]
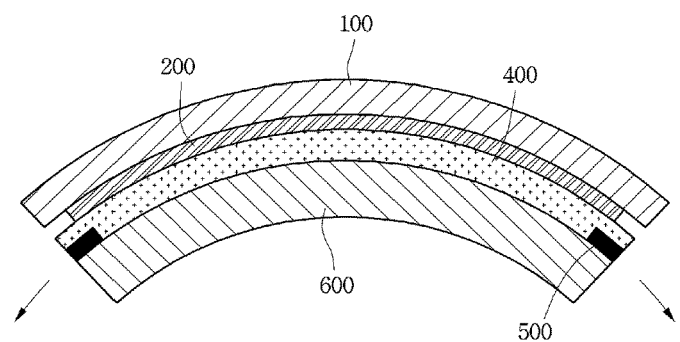

[Fig. 17]
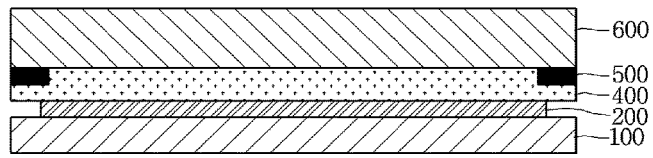
[Fig. 18]
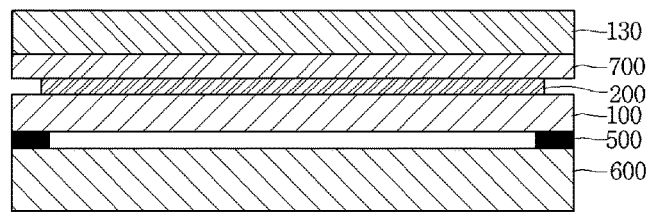
[Fig. 19]
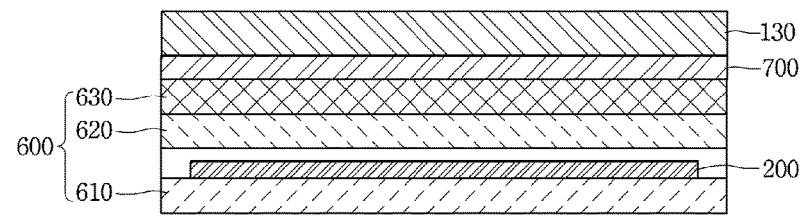
[Fig. 20]
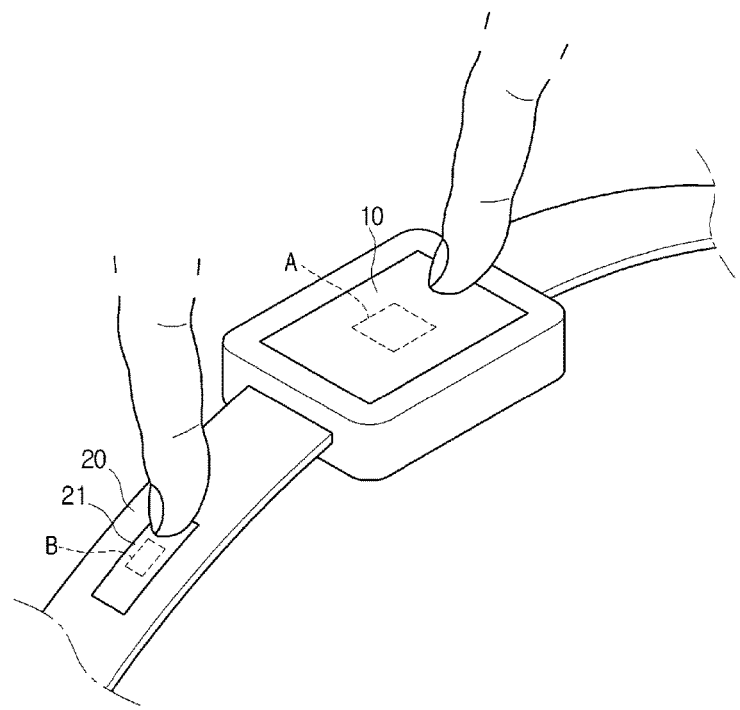

[Fig. 21]
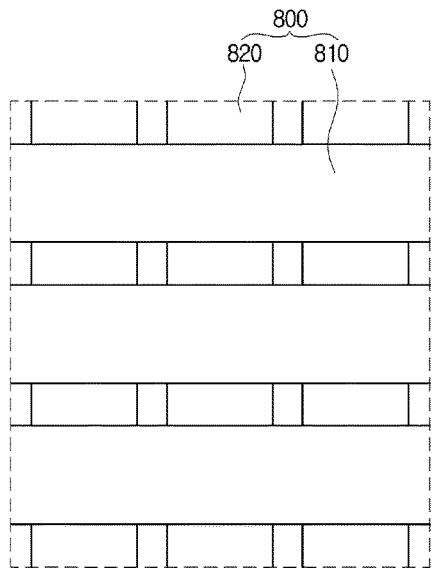
[Fig. 22]
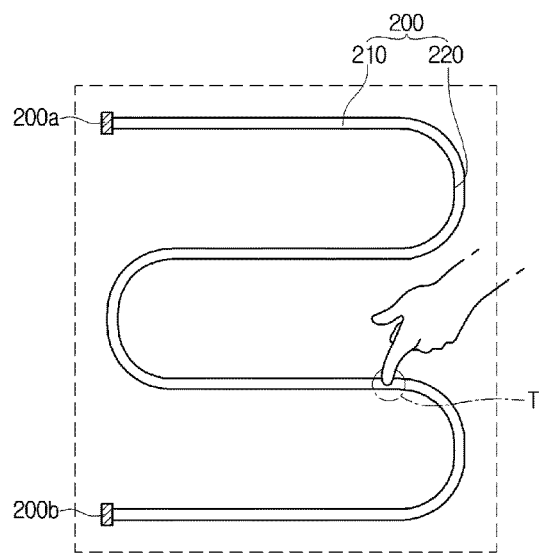
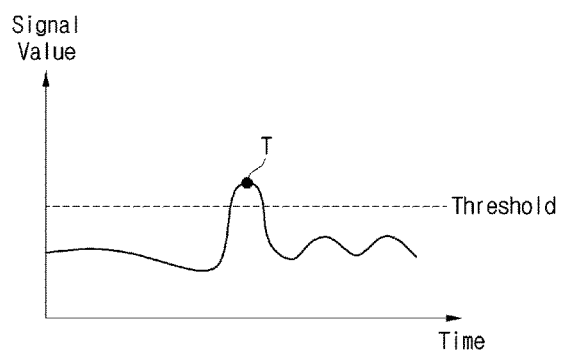

[Fig. 23]
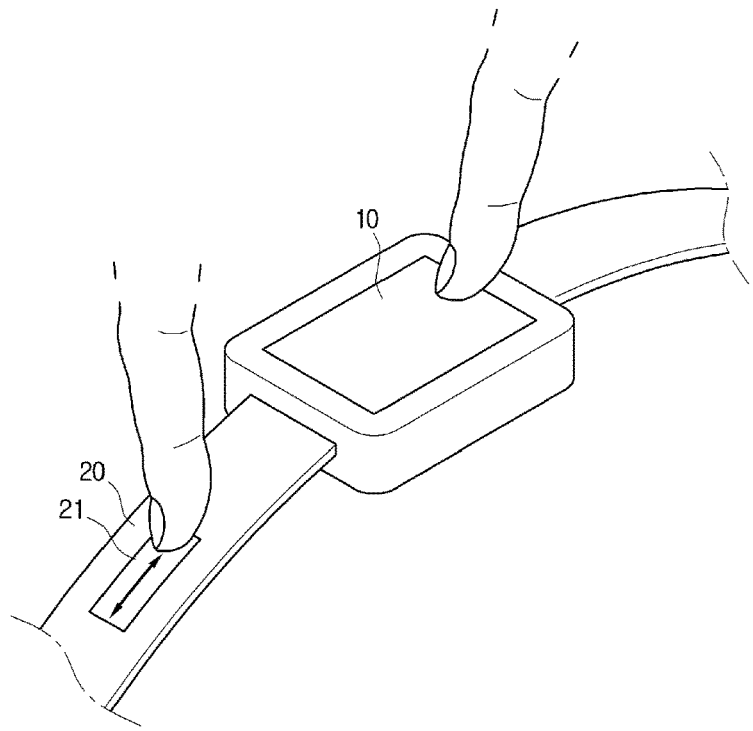
[Fig. 24]
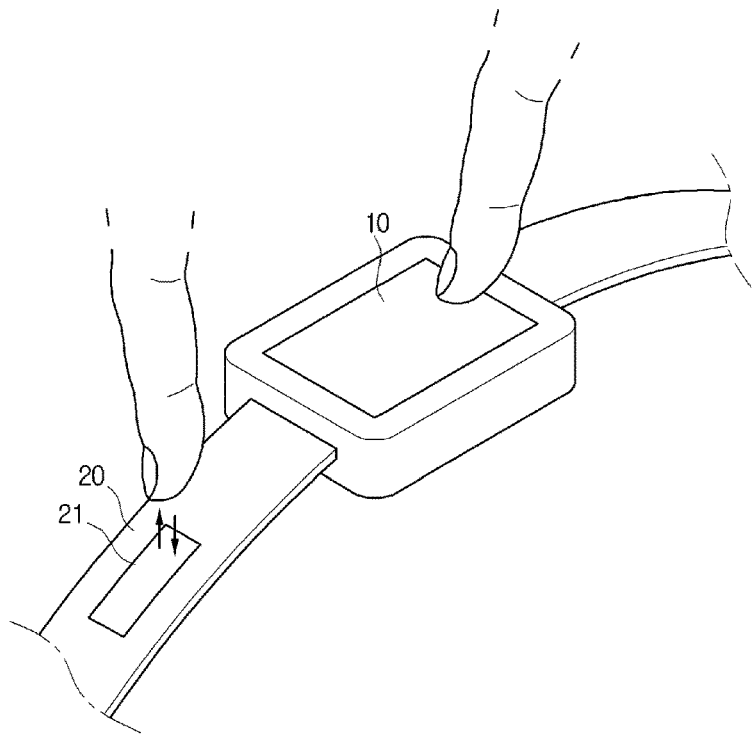

[Fig. 25]
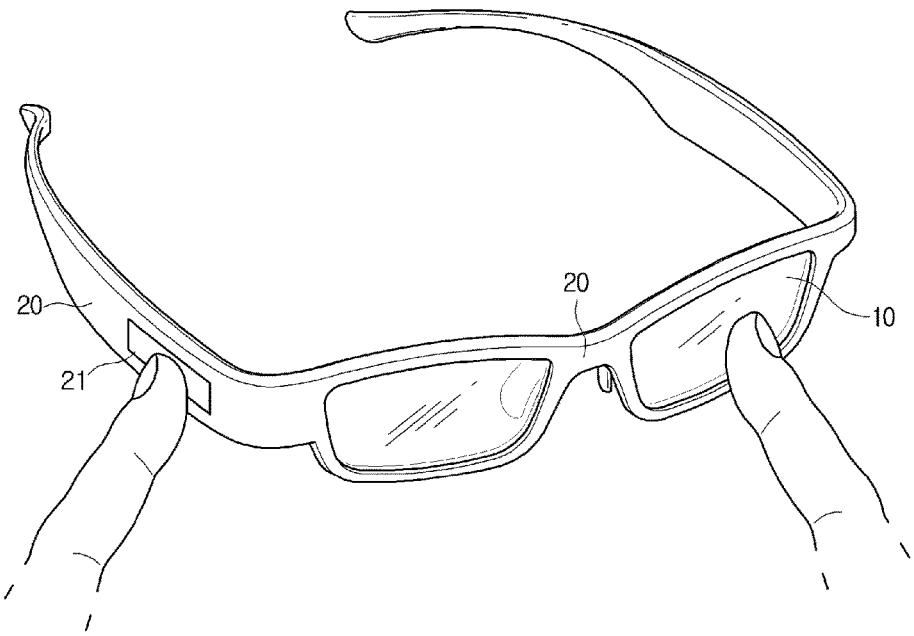
[Fig. 26]
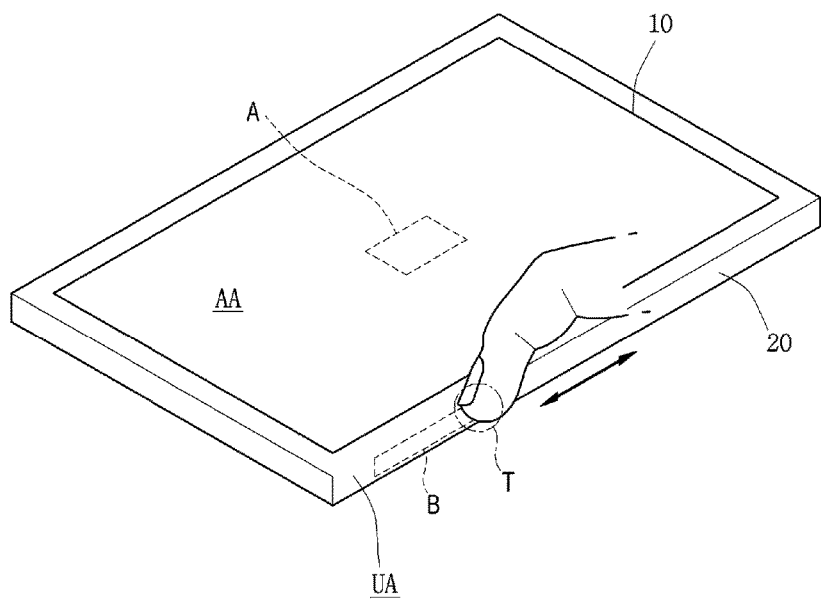

[Fig. 27]
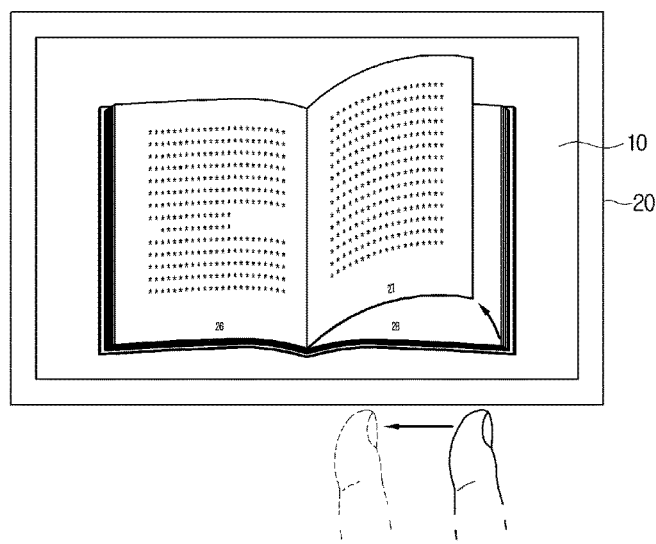
[Fig. 28]
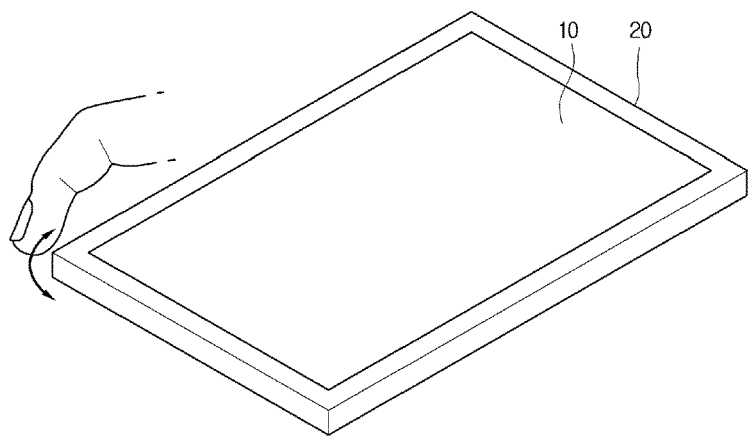
[Fig. 29]
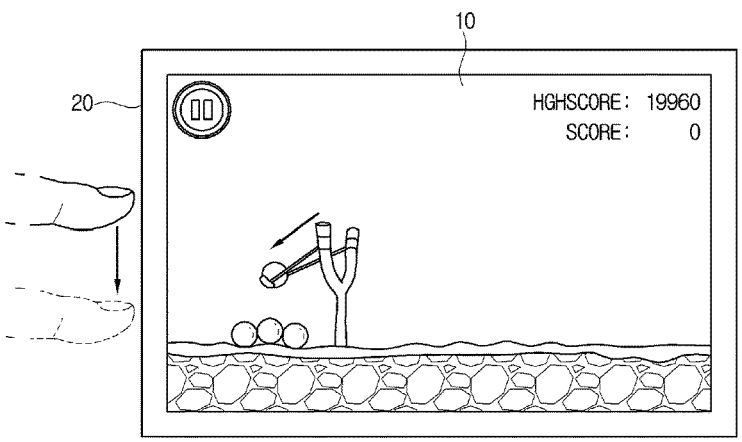

[Fig. 30]
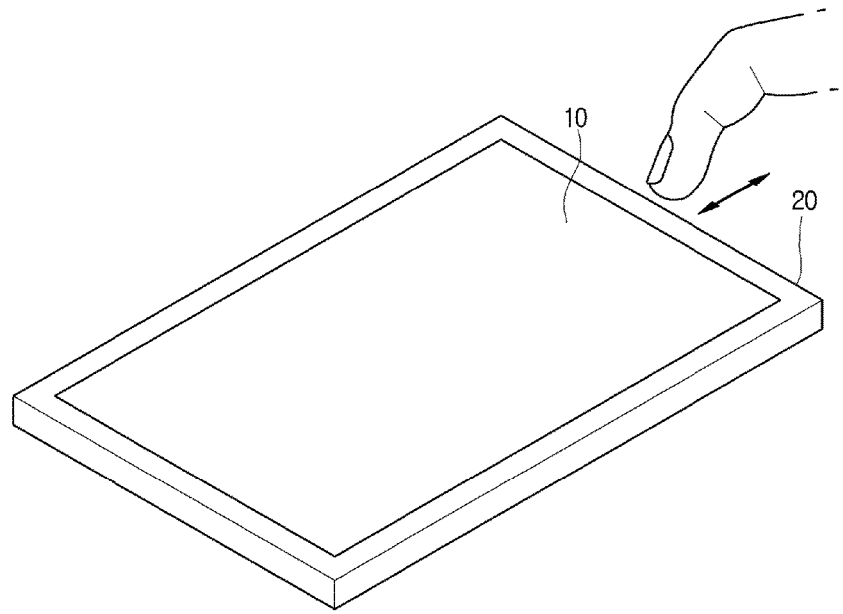
[Fig. 31]
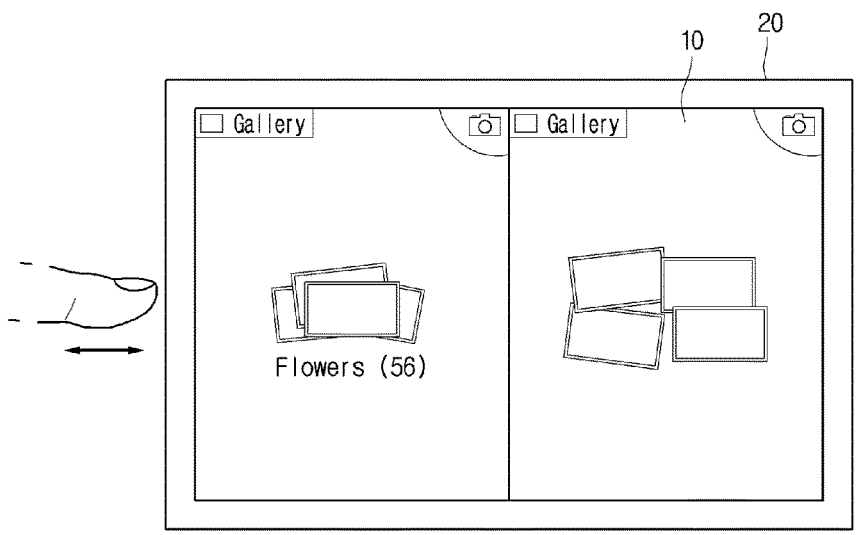

[Fig. 32]
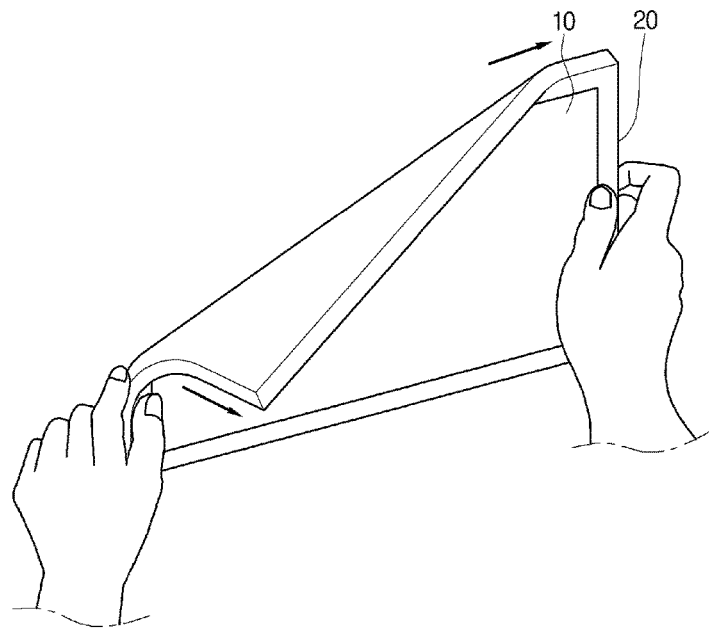
[Fig. 33]
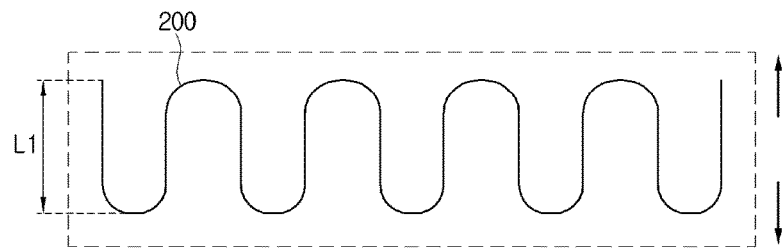
[Fig. 34]
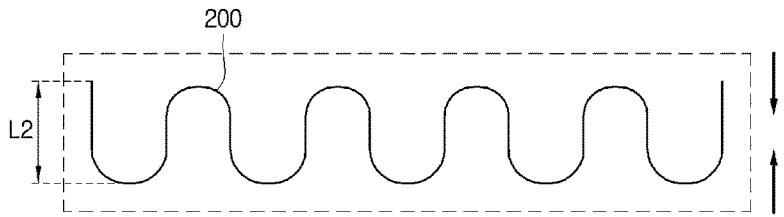

[Fig. 35]
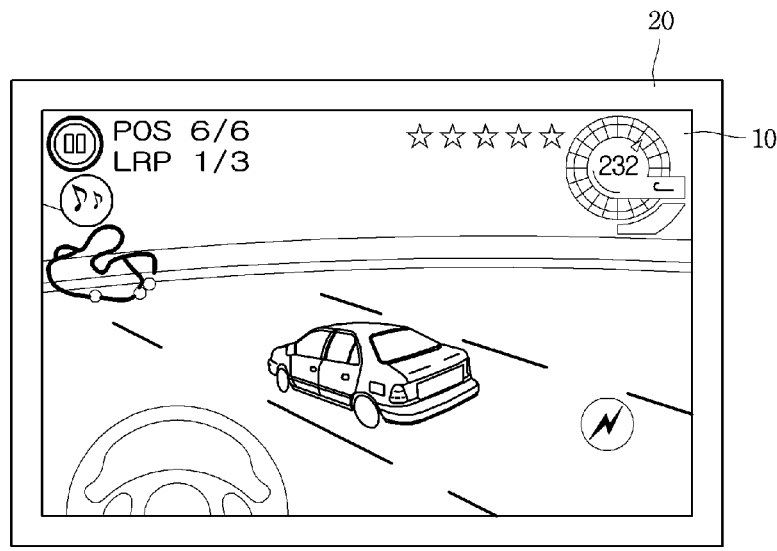
[Fig. 36]
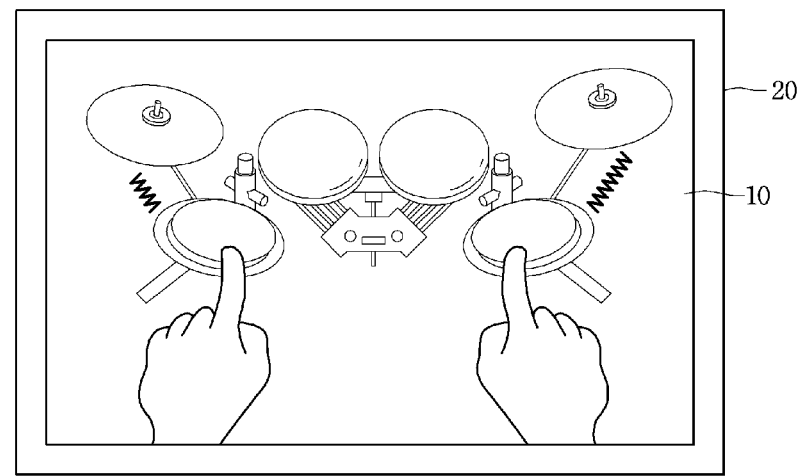

TIME DOMAIN REFLECTOMETRY TOUCH WINDOW SENSOR

CROSS REFERENCE TO RELATED APPLICATIONS

This application is the National Phase of PCT International Application No. PCT/KR2014/012927, filed on Dec. 26, 2014, which claims priority under 35 U.S.C. 119(a) to Patent Application Nos. 10-2014-0006339, filed in the Republic of Korea on Jan. 17, 2014, 10-2014-0013000, filed in the Republic of Korea on Feb. 5, 2014, 10-2014-0013001, filed in the Republic of Korea on Feb. 5, 2014, and 10-2014-0018128, filed in the Republic of Korea on Feb. 17, 2014, all of which are hereby expressly incorporated by reference into the present application.

TECHNICAL FIELD

The embodiment relates to a touch window and a touch device.

Background Art

Recently, a touch panel, which performs an input function through the touch of an image displayed on a display device by an input device such as a stylus pen or a hand, has been applied to various electronic appliances.

Schemes of sensing the position of a touch representatively include a resistive touch scheme and a capacitive touch scheme. A touch panel employing the resistive touch scheme senses the position of the touch is sensed by sensing the variation in resistance according to the connection between electrodes when pressure is applied to the input device. A touch panel employing the capacitive touch scheme senses the position of the touch by sensing the variation in capacitance between electrodes when a finger of the user touches the capacitive touch panel. When taking into consideration the convenience of a fabrication scheme and a sensing power, the capacitive touch panel has been spotlighted in a smaller model touch panel recently.

Meanwhile, recently, there is required a scheme of more accurately and simply sensing the position of the touch in addition to the above schemes.

DISCLOSURE OF INVENTION

Technical Problem

The embodiment provides a touch window employing a novel scheme, a display device, and a touch device.

The embodiment provides a touch window having enhanced visibility, a display device including the same, and a touch device including the same.

Solution to Problem

According to the embodiment, there is provided a touch window including a substrate, and a sensor part provided on the substrate to process a sensing process through a time domain reflectometry. The sensor part includes a conductive pattern.

According to another embodiment, there is provided a touch window including a substrate, and a sensor part provided on the substrate to perform a sensing process through a time domain reflectometry. The sensor part includes a first sensor part to receive a first signal, and a second sensor part adjacent to the first sensor part to receive a second signal.

According to the embodiment, there is provided a touch device including a screen section, a peripheral section to surround the screen section, and a touch window in at least one of the screen section and the peripheral section. The touch window comprises a sensor part to sense a touch position or a touch pressure.

Advantageous Effects of Invention

As described above, according to the touch window and the display device of the embodiment, the sensing process can perform through a TDR scheme. Meanwhile, through the TDR scheme, a touch gesture as well as the position of the touch can be recognized. In other words, the touch gesture such as a drawing operation can be recognized in the sensor part. In addition, repeated touch gestures can be recognized in the sensor part. Therefore, a differentiated user interface can be provided, and user experience can be expanded.

Through the TDR scheme, the diameter of a touch tip can be reduced. In other words, as compared with a conventional capacitive touch scheme, the diameter of the touch tip can be reduced to a diameter in the range of 0.5 to 0.8. For example, the diameter of the touch tip can be reduced to 1Φ or less. Accordingly, the touch can be accurately recognized.

In addition, as compared with the conventional capacitive touch scheme, a touch sensing speed can be improved. In other words, the touch sensing speed may be increased to several microseconds (µs).

Meanwhile, the sensor part has a conductive pattern, so that the pattern of the sensor part cannot be viewed from the top of the sensor part. In other words, even if the sensor part includes metal, the pattern cannot be viewed. In addition, even if the sensor part is applied to a large size window, the resistance of the touch window can be reduced.

In addition, when the touch window is bent, the touch window may be bent without any physical damages of the sensor part. Accordingly, the bending characteristic and the reliability of the touch window can be improved.

According to the embodiment, the accuracy of the touch position can be improved through the second sensor part adjacent to the first sensor part. Therefore, the uniform characteristic and the accuracy of the touch point can be ensured in the sensor part through the complementary corporation between the first and second sensor parts. In other words, even if resistance is varied depending on the material of the sensor part, the uniform touch sensitivity can be maintained, and the accuracy of multi-touches can be improved.

Meanwhile, the edge region of a conventional electronic appliance is limited to a button-type touch function due to the structural limitation of the electronic appliance. However, according to the embodiment, the limitation can be overcome. In other words, the differentiated user interface can be provided, and the experience of the user can be enlarged.

Further, according to the embodiment, both of the position and the pressure of touch can be sensed through the same sensor part. Accordingly, various user interfaces can be provided through the simple structure.

In addition, according to the embodiment, the touch function is provided to an opaque part (peripheral section) as well as the transparent screen section, so that the differentiation of a user interface can be ensured.

BRIEF DESCRIPTION OF DRAWINGS

FIG. 1 is a plan view showing a touch window according to the embodiment.

FIG. 2 is a view to explain a sensing scheme of a sensor part.

FIGS. 3 to 8 are plan views showing a touch window according to another embodiment.

FIGS. 9 to 14 are views to explain a touch window according to another embodiment.

FIGS. 15 to 19 are sectional views showing a touch device according to various embodiments.

FIGS. 20 to 25 are sectional views to explain a touch device according to the embodiments.

FIGS. 26 to 36 are views to explain a touch device according to the other embodiments.

MODE FOR THE INVENTION

In the following description of the embodiments, it will be understood that, when a layer (film), a region, a pattern or a structure is referred to as being "on" or "under" a substrate, another layer (film), another region, another pad or another patterns, it can be "directly" or "indirectly" on the other layer (film), the other region, the other pattern or the other structure, or one or more intervening layers may also be present. Such a position of each layer described with reference to the drawings.

In the following description, when a part is connected to the other part, the parts are not only directly connected to each other, but also electrically connected to each other while interposing another part therebetween. In the following description, when a pre-determined part "includes" a predetermined component, the predetermined part does not exclude other components, but may further include other components unless the context clearly indicates otherwise.

The thickness and size of each layer (film), region, pattern, or structures shown in the drawings may be modified for the purpose of convenience or clarity of explanation. In addition, the size thereof does not utterly reflect an actual size.

Hereinafter, the embodiment of the present invention will be described in detail with reference to accompanying drawings.

FIG. 1 is a plan view showing a touch window according to the embodiment. FIG. 2 is a view to explain a sensing scheme of a sensor part. FIGS. 3 to 8 are plan views showing a touch window according to another embodiment.

Referring to FIGS. 1 to 9, the touch window according to the embodiment includes a substrate 100 and a sensor part 200.

The substrate 100 may be rigid or flexible. For example, the substrate 100 may include glass or plastic. In detail, the substrate 100 may include chemically tempered/semi-tempered glass, such as soda lime glass or aluminosilicate glass, reinforced or flexible plastic, such as polyimide (PI), polyethylene terephthalate (PET), propylene glycol (PPG), or polycarbonate (PC), or sapphire.

In addition, the substrate 100 may include an optical isotropic film. For example, the substrate 100 may include cyclic olefin copolymer (COC), cyclic olefin polymer (COP), optical isotropic polycarbonate (PC), or optical isotropic poly(methyl methacrylate) (PMMA).

The sapphire has superior electric characteristics, such as permittivity, so that a touch response speed may be significantly increased and a space touch such as hovering may be easily realized. In addition, since the sapphire has high surface strength, the sapphire is applicable to a cover substrate. The hovering refers to a technique of recognizing coordinates even in a position spaced apart from a display by a short distance.

In addition, the substrate 100 is bendable with a partially curved surface. In other words, the substrate 100 is bendable while a portion of the substrate 100 has a flat surface and another portion of the substrate 100 has a curved surface. In detail, an end portion of the substrate 100 may be bent with a curved surface or may be curved or bent with a surface having a random curvature.

In addition, the substrate 100 may include a flexible substrate having a flexible property.

In addition, the substrate 100 may include a curved substrate or a bended substrate. In other words, the touch window including the substrate 100 may be formed with a flexible, curving, or bending characteristic. Accordingly, the touch window according to the embodiment can be easily carried by a user and may be modified to touch windows having various designs.

The substrate 100 may be provided thereon with a sensing electrode, a wire electrode, and a printed circuit board. In other words, the substrate 100 may include a support substrate.

The substrate 100 may include a cover substrate. In other words, the sensing electrode, the wire electrode, and the printed circuit board may be supported by the cover substrate. In addition, the substrate 100 may be additionally provided thereon with a cover substrate. In other words, the sensing electrode, the wire electrode, the electrode, and the printed circuit board may be supported by the substrate 100, and the substrate 100 and the cover substrate may be combined (bonded) to each other through an adhesive layer.

The substrate 100 may have an active area AA and/or an unactive area UA defined therein, but the embodiment is not limited thereto. An image may be displayed in the active area AA. The image is not displayed in the unactive area UA provided at a peripheral portion of the active area AA. In addition, the position of an input device (e.g., finger) may be sensed in at least one of the active area AA and the unactive area UA. If the input device, such as a finger, touches the touch window, the difference between electrical signals occurs at the touched part by the input device, and the difference is measured to recognize the position of the touched part.

The substrate 100 may be provided thereon with the sensor part 200 to allow touch input. In other words, the sensor part 200 may be provided on the substrate 100 to sense touch input.

The sensor part 200 may include first and second sensor parts 210 and 220. The first sensor part 210 may extend in a first direction. The second sensor part 220 may extend in a second direction crossing the first direction. The first sensor part 210 may be integrally formed with the second sensor part 220. In other words, the second sensor part 220 may extend from the first sensor part 210. The first and second sensor parts 210 and 220 having mutually different directionalities may be alternately and repeatedly provided throughout the entire surface of the substrate 100. Therefore, the sensor part 200 may have a predetermined symmetrical property and a predetermined repetition property. Accordingly, the embodiment is not limited to the structure of FIG.

1, but the sensor part 200 may have various patterns that may be repeatedly provided throughout the entire surface of the substrate 100.

Further, the first and second sensor parts 210 and 220 may have mutually different shapes. For example, referring to FIG. 1, the first sensor part 210 may have a linear shape extending in the first direction, and the second sensor part 220 may have a curved shape extending in the second direction.

Meanwhile, each of the first and second sensor parts 210 and 220 may have a length of 1 cm or longer.

When the sensor part 200 is provided in the unactive area UA, the sensor part 200 may include an opaque conductive material, but the embodiment is not limited thereto.

When the sensor part 200 is provided in the active area AA, the sensor part may include a transparent conductive material allowing electricity to flow without the interruption of light transmission, but the embodiment is not limited thereto.

For example, a sensing electrode may include a metallic oxide, such as indium tin oxide, indium zinc oxide, copper oxide, tin oxide, zinc oxide, or titanium oxide.

In addition, the sensor part 200 may include nanowire, a photosensitive nanowire film, a carbon nanotube (CNT), graphene, conductive polymer, or the mixture thereof.

In addition, the sensor part 200 may include various metallic materials. For example, the sensor part 200 may include at least one of chromium (Cr), nickel (Ni), copper (Cu), aluminum (Al), silver (Ag), molybdenum (Mo), gold (Au), titanium (Ti) and the alloy thereof.

The sensor part 200 may include a conductive pattern. The conductive pattern may include a plurality of conductive pattern lines P. For example, the sensor part 200 may be provided at a mesh pattern. In this case, the mesh pattern may be formed in random to prevent a moire phenomenon. The moire phenomenon occurs when periodical stripes overlap with each other. Since adjacent strips overlap with each other, thicknesses of strips are thickened so that the strip is spotlighted as compared with other stripes. Thus, in order to prevent such a moire phenomenon, various shapes of conductive patterns may be provided.

In detail, the sensor part 200 may include a conductive pattern opening part OA and a conductive pattern line part LA. In this case, a line width W of the conductive pattern line part LA may be in the range of 0.1 μm to 10 μm. The conductive pattern line part LA having less than about 0.1 μm may not be formed due to the characteristics of the manufacturing process. When the line width W is 10 μm or, the pattern of the sensor part 200 may be not viewed from the outside. Preferably, the line width W of the conductive pattern line part LA may be in the range of 0.5 μm to 7 μm. More preferably, the line width W of the conductive pattern line part LA may be in the range of 1 μm to 3.5 μm.

Meanwhile, as shown in FIG. 1, the conductive pattern may have a regular shape. Accordingly, the conductive pattern opening part OA may have various shapes, such as a square shape, a diamond shape, a pentagon shape, or a hexagonal shape, or a circular shape. In addition, the conductive pattern opening part OA may have a regular shape or a random shape.

However, the embodiment is not limited thereto, but the conductive pattern may have an irregular shape. In other words, conductive pattern opening parts may be variously provided in one conductive pattern. Therefore, the sensor part 200 may include conductive pattern opening parts having various shapes and various sizes.

As the sensor part 200 may have the mesh shape, the pattern of the sensor part 200 may not be viewed from the top of the substrate 100. In other words, even if the sensor part 200 includes metal, the pattern may not be viewed. In addition, even if the sensor part 200 is applied to a large-size touch window, the resistance of the touch window may be reduced.

In addition, when the touch window is bent, the touch window may be bent without any physical damages of the sensor part 200. Accordingly, the bending characteristic and the reliability of the touch window can be improved.

The sensor part 200 may perform a sensing process through a time domain reflectrometry (TDR). The sensor part 200 may recognize the position of the touch through the TDR. In detail, referring to FIG. 2, the TDR is a scheme of sensing a touch point by analyzing a portion of a signal which is reflected from a point (touch point T) having great impedance to return as the signal is applied based on a transmission line theory to progress along the pattern of the sensor part 200. In other words, the input device can sense X and Y coordinates (2D) of the touch point using a signal formed above and below a threshold point in a time domain, which is provided due to impedance increase at the touch point. According to the related art, the TDR scheme is used to sense the disconnection of a cable.

In this case, the sensor part 200 includes one end 200a to generate AN energy pulse and an opposite end 200b to terminate the energy pulse as a signal is transmitted along the sensor part 200. The energy pulse is transmitted along an electrically conductive path (e.g., transmission line) having constant impedance. When the energy pulse reaches an unterminated end of the electrically conductive path or impedance varies along the electrically conductive path, a portion or the entire portion of the energy pulse is reflected toward the source of the energy pulse. If two metallic conductors are provided significantly closely to each other, two metallic conductors form a transmission line having characteristic impedance determined by the space and the dielectric between the metallic conductors. If the transmission line is terminated with the characteristic impedance thereof, a reflective pulse, which returns to the start point of the transmission line to generate the energy pulse, may not be generated. If the transmission line is unterminated, a positive reflective pulse may be generated as the transmitted energy pulse returns to the start point of the transmission line to generate the energy pulse. If impedance variation occurs at any place of the transmission line, the reflective pulse may be continuously generated and sensed. The return time of the reflective pulse to a pulse source position is used to determine a distance in which the impedance variation occurs. The increase of the capacitance along the transmission line (e.g., due to the touch by a finger) may make the transmission pulse having the returning reflective pulse a negative pulse.

Meanwhile, through the TDR scheme, a touch gesture as well as the position of the touch can be recognized. In other words, the touch gesture such as a drawing operation can be recognized on the substrate 100. In addition, repeated touch gestures can be recognized on the substrate 100. Therefore, a differentiated user interface can be provided, and user experience can be expanded.

Through the TDR scheme, the diameter of a touch tip can be reduced. In other words, as compared with a conventional capacitive touch scheme, the diameter of the touch tip can be reduced to a diameter in the range of 0.5 to 0.8. For example, the diameter of the touch tip may be reduced to 1Φ or less. Accordingly, the touch can be accurately recognized.

In addition, as compared with the conventional capacitive touch scheme, a touch sensing speed can be improved. In other words, the touch sensing speed may be increased to several microseconds (μs).

Hereinafter, the touch window according to another embodiment will be described with reference to FIG. 3. For the clear and simple explanation, the details thereof the structure and the components the same as or similar to those described above will be omitted below.

Referring to FIG. 3, a sensor part 200 according to another embodiment may include first and second sensor parts 211 and 221. The sensor part 200 may include a conductive pattern. The sensor part 200 may include a plurality of conductive pattern lines 21.

In detail, referring to FIG. 3, the first sensor part 211 may extend in the first direction, and the second sensor part 221 may extend in the second direction crossing the first direction. The second sensor part 221 may extend from the first sensor part 211. In this case, the ratio of the length L1 of the first sensor part to the length L2 of the second sensor part 221 may be in the range of 0.5:1 to 1.5:1.

Thereafter, a first prime sensor part 211' may extend from the second sensor part 221. In this case, the ratio of the length L1' of the first prime sensor part 211' to the length L2 of the second sensor part 221 may be in the range of 0.5:1 to 1.5:1.

The second prime sensor part 221' may extend from the first prime sensor part 211'. In this case, the ratio of the length L1' of the first prime sensor part 211' to the length L2' of the second prime sensor part 221' may be in the range of 0.5:1 to 1.5:1.

The first sensor part 211, the second sensor part 221, the first prime sensor part 211' and the second prime sensor part 221' may be alternately provided on the entire surface of the substrate 100.

Meanwhile, referring to FIG. 4, a substrate 100 in the touch window according to another embodiment includes first and second areas 1A and 2A. The first and second areas 1A and 2A may bisect the substrate 100. Sensor parts 201 and 202 may be provided on the first and second areas 1A and 2A, respectively.

In detail, the first area-sensor part 201 may be provided in the first area 1A, and the second area-sensor part 202 may be provided in the second area 2A. The first area-sensor part 201 and the second area-sensor part 202 may have shapes corresponding to each other. In other words, the first area-sensor part 201 and the second area-sensor part 202 may have the same shape, but the embodiment is not limited thereto. The first area-sensor part 201 and the second area-sensor part 202 may have mutually different shapes.

The first area-sensor part 201 and the second area-sensor part 202 may perform sensing through the TDR.

Accordingly, the first area-sensor part 201 includes one end 201a to generate energy pulses and an opposite end 201b to terminate the energy pulses as a signal is transmitted along the first area-sensor part 201. Similarly, the second area-sensor part 202 includes one end 202a to generate energy pulses and an opposite end 202b to terminate the energy pulses as a signal is transmitted along the second area-sensor part 202.

In other words, one end 201a and an opposite end 201b of the first area-sensor part 201 may be provided together in the first area 1A. In addition, one end 202a and an opposite end 202b of the second area-sensor part 202 may be provided together in the second area 2A.

According to the embodiment, each of the first area-sensor part 201 and the second area-sensor part 202 recognizes the position of a touch, so that the position of the touch can be more accurately recognized. In addition, the uniform touch sensitivity can be maintained, and multi-touches can be more exactly performed.

Meanwhile, referring to FIG. 5, according to another embodiment, the shapes of the first area-sensor part 201 and the second area-sensor part 202 may be different from those shown in FIG. 4.

In this case, one end 201a and an opposite end 201b of the first area-sensor part 201 may be provided together in the first area 1A, and one end 202a and an opposite end 202b of the second area-sensor part 202 may be provided together in the second area 2A, which makes a difference from the case that one end 200a and an opposite end 200b of the above-described sensor part 200 shown in FIG. 3 are provided in areas different from each other, respectively.

Meanwhile, referring to FIG. 6, according to another embodiment, the substrate 100 may include a plurality of areas. The substrate 100 may be divided into three areas. The substrate 100 may include a first area 1A, a second area 2A, and a third area 3A. In this case, the sensor parts 203, 204, and 205 may be provided in the first to third areas 1A to 3A, respectively. The sensor parts 203, 204, and 205 may have a one linear shape extending in the second direction. Accordingly, one end 203a and the opposite end 203b of the sensor part 203 may be provided together in the area 1A in which the sensor part 203 is provided, one end 204a and the opposite end 204b of the sensor part 204 may be provided together in the area 2A in which the sensor part 204 is provided, and one end 205a and the opposite end 205b of the sensor part 205 may be provided together in the area 3A in which the sensor part 205 is provided Meanwhile, referring to FIG. 7, according to another embodiment, a ground electrode 300 may be further provided adjacent to the sensor part 200.

The ground electrode 300 may be provided adjacent to the sensor part 200. The ground electrode 300 may extend along the sensor part 200. The ground electrode 300 may include a first ground electrode 301 and a second ground electrode 302. The first and second ground electrodes 301 and 302 may extend while interposing the sensor part 200 therebetween.

The ground electrode 300 prevents external static electricity or ESD from being introduced into the display device. In other words, the static electricity or the ESD can be prevented from being introduced into the display device as the static electricity or the ESD moves along the path of the sensor part 200. Therefore, the static electricity is prevented in the display device so that the sensing failure can be prevented. Accordingly, signal interference is prevented, so that the accuracy and the reliability of the touch can be improved.

In this case, the ground electrode 300 may include a conductive pattern. In other words, the ground electrode 300 may have a mesh shape. The ground electrode 300 may include a plurality of conductive pattern lines 30. The conductive pattern may be the same as or similar to that formed in the sensor part 200.

Meanwhile, referring to FIG. 8, a dummy part 280 may be additionally provided adjacent to the sensor part 200. The dummy part 280 may be interposed between sensor parts 200. In other words, the dummy part 280 may be interposed between first sensor parts 210 or between second sensor parts 220.

In addition, although not shown in drawings, the dummy part 280 may be provided adjacent to the ground electrode 300. In other words, the dummy part 280 may be interposed between the sensor part 200 and the ground electrode 300.

The dummy part 280 may include a conductive pattern. In other words, the dummy part 280 may have a mesh shape.

The dummy part 280 may have the same material as that of the sensor part 200. Accordingly, the optical characteristic and the visibility of the touch window can be improved through the dummy part 280. In particular, when the sensor part 200 is provided in a screen area of the display, the dummy part 280 may prevent the conductive patterns of the sensor parts 200 from being opaquely or cloudily viewed In this case, the interval G between the sensor part 200 and the dummy part 280 may be 150 μm or less. In detail, the interval G between the sensor part 200 and the dummy part 280 may be in the range of 1 μm to 150 μm. Accordingly, the pattern of the sensor part 200 can be prevented from being viewed, and the optical characteristic and the visibility of the display device including the sensor part 200 can be improved.

Although FIG. 8 shows that dummy parts 250 having a circular shape are arranged in one row, the embodiment is not limited thereto. Accordingly, the dummy parts 250 may have various shapes, and may be arranged in various numbers. In addition, the sensor part 200 and the dummy part 250 may have the same pattern or the same shape.

FIGS. 9 to 14 are views to explain a touch window according to another embodiment.

Referring to FIGS. 9 to 14, a touch window according to sill another embodiment includes a sensing part 100 and a sensor part 200 provided in the sensing part 100.

The sensing part 100 allows the input of a touch command by a user. The sensing part 100 is provided therein with the sensor part 200 to allow the touch input. In other words, the sensor part 200 to sense the touch input may be provided in the sensing part 100.

The sensor part 200 may include a first sensor part 210 and a second sensor part 220.

The first and second sensor parts 210 and 220 may be provided on the entire surface of the sensing part 100. In detail, the first sensor part 210 may extend with mutually different directionality. The first sensor part 210 may include a first sub-sensor part 211 and a second sub-sensor part 212. The first sub-sensor part 211 may extend in the first direction. The second sub-sensor part 212 may extend in the second direction crossing the first direction. The first sub-sensor part 211 and the second sub-sensor part 212 may be integrally formed with each other. In other words, the second sub-sensor part 212 may extend from the first sub-sensor part 211. The first and second sub-sensor parts 211 and 212 having mutually different directionalities may be repeatedly arranged throughout the entire surface of the sensing part 100. Accordingly, the embodiment is not limited to the structure of FIG. 9, but the first sensor part 210 may have various patterns that may be repeatedly provided throughout the entire surface of the sensing part 100.

The second sensor part 220 may be provided adjacent to the first sensor part 210. The second sensor part 220 may extend along the first sensor part 210. The second sensor part 220 may in a shape the same as or similar to that of the first sensor part 210.

Meanwhile, when the first sensor part 210 represents a high-resistance electric characteristic, or when more than two points are touched by the first sensor part 210, signal loss may occur. Accordingly, impedance variation does not equally occur at the touched two points, and the impedance variation at a point, which is secondly touched, may be reduced as compared with the impedance variation at a point which is first touched. In addition, as if the magnitude of a wave is attenuated, the magnitude of signal variation may be attenuated. Accordingly, the positions of the two touched points may not accurately sensed. The accuracy of the touch positions may be degraded.

Therefore, according to the embodiment, the above problem can be solved by the second sensor part 220 provided adjacent to the first sensor part 210, so that the accuracy of the touch position can be improved. In other words, referring to FIG. 11, a first signal 1S may be applied to the first sensor part 210, and a second signal 2S may be applied to the second sensor part 220. In this case, the first and second signals 1S and 2S may be progressed in direction opposite to each other.

Therefore, when a first point T1 is touched, the impedance variation may occur at the first sensor part 210 and the second sensor part 220 provided at the first point T1. In detail, first impedance 1I may be varied at the first point T1 of the first sensor part 210, and second impedance 2I may be varied at the first point T1 of the second sensor part 220. In this case, the first impedance 1I may be different from the second impedance 2I. Therefore, as if the sensitivity for one of the first and second impedances 1I and 2I is degraded, the touch position can be recognized through the sensitivity for the other. In other words, the first and second sensor parts 210 and 220 are complementary so that the accuracy of the touch positions can be improved.

Meanwhile, when the first to third points T1 to T3 are simultaneously touched, the impedance variation may occur in the first and second sensor parts 210 and 220. In this case, the impedance variation may be sequentially reduced from the first point T1 toward the third point T3 through the second point T2 in the first sensor part 210. Meanwhile, since a signal opposite to a signal applied to the first sensor part 210 is applied to the first sensor part 220, the impedance variation may be sequentially reduced from the third point T3 to the first point T1 through the second point T2. Therefore, the touch recognition at the third point T3 may be weak in the first sensor part 210. The weak touch recognition at the third point T3 in the first sensor part 210 can be complemented by the second sensor part 220. In addition, the touch recognition at the first point T1 may be weak in the second sensor part 220. The weak touch recognition at the first point T1 in the second sensor part 220 may be complemented by the first sensor part 210. In other words, the position of the first point T1 may be sensed through the variation of the first sensor part 210, and the position of the third point T3 may be sensed through the variation of the second sensor part 220. Accordingly, the uniform characteristic and the accuracy of the touch point can be ensured in the sensor part 200 through the complementary corporation between the first and second sensor parts 210 and 220. In other words, even if resistance is varied depending on the material of the sensor part, the uniform touch sensitivity can be maintained, and the accuracy of the multi-touches can be improved.

The first sensor part 210 and the second sensor part 220 may be connected with the same multiplexer M. The signals are multiplexed through the multiplexer M and connected with the sensor part 200.

Meanwhile, the embodiment is not limited thereto, but the signals applied to the first and second sensor parts 210 and 220 may be progressed in the same direction. In other words, the first and second signals 1S and 2S may be progressed in the same direction. Accordingly, two impedance variations can be sensed as compared with one sensor part, so that the uniform characteristic of the sensor part 200 and the accuracy of the touch position can be ensured. In this case, the first and second sensor parts 210 and 220 are connected with mutually different multiplexers (M), respectively, to be driven and to perform sensing.

Meanwhile, through the TDR scheme, a touch gesture as well as the position of the touch can be recognized. In other words, the touch gesture such as a drawing operation can be recognized in the sensing part 100. In addition, repeated touch gestures can be recognized in the sensing part 100. Therefore, a differentiated user interface can be provided, and user experience can be expanded.

Through the TDR scheme, the diameter of a touch tip can be reduced. In other words, as compared with a conventional capacitive touch scheme, the diameter of the touch tip can be reduced to a diameter in the range of 0.5 to 0.8. For example, the diameter of the touch tip may be reduced to 1Φ or less. Accordingly, the touch can be accurately recognized.

In addition, as compared with the conventional capacitive touch scheme, a touch sensing speed can be improved. In other words, the touch sensing speed may be increased to several microseconds (μs).

Hereinafter, referring to FIG. 12, a touch window according to another embodiment will be described with reference to FIG. 12. For the clear and simple explanation, the details thereof the structure and the components the same as or similar to those described above will be omitted below.

The touch window according to the embodiment further includes ground electrodes 310, 320, and 330 provided adjacent to the first and second sensor parts 210 and 220. The ground electrodes 310, 320, and 330 may extend along the first and second sensor parts 210 and 220.

The ground electrodes 310, 320, and 330 prevent external static electricity or ESD from being introduced into the display device. In other words, the static electricity or the ESD can be prevented from being introduced into the display device as the static electricity or the ESD moves along the path of the first and second sensor parts 210 and 220. Therefore, the static electricity is prevented in the display device so that the sensing failure can be prevented. Accordingly, signal interference is prevented, so that the accuracy and the reliability of the touch can be improved.

Hereinafter, a touch window according to another embodiment will be described with reference to FIG. 13.

The touch window according to another embodiment further includes third and fourth sensor parts 230 and 240 provided adjacent to the first and second sensor parts 210 and 220.

A first signal 1S may be applied to the third sensor part 230. In other words, the third sensor part 230 may receive a signal progressing in the same direction as that of a signal applied to the first sensor part 210.

A second signal 2S may be applied to the fourth sensor part 240. In other words, the fourth sensor part 240 may receive a signal progressing in the same direction as that of a signal applied to the second sensor part 220.

Therefore, impedance variations simultaneously occur in a plurality of sensor parts as one point is touched, so that the accuracy of the position of the touch can be more improved.

In this case, the first and second sensor parts 210 and 220 may be connected with a first multiplexer (M1). The third and fourth sensor parts 230 and 240 may be connected with a second multiplexer (M2).

The above-described touch windows according to various embodiments can be applied display devices according to various embodiments.

FIGS. 15 to 19 are sectional views showing display devices according to various embodiments. Referring to FIG. 15, the touch window may be provided on a driving part 600. The driving part 600 may include a display panel. A protective film 400 may be provided on the driving part 600, and the touch window and the driving part 600 are combined with each other through an adhesive film 500, thereby constituting the display device.

In particular, referring to FIG. 16, the touch window may include a curved touch window or a flexible touch window that is bent. Accordingly, the display device including the touch window may include a curved display device or a flexible display device.

A display area is formed in the driving part 600 to output an image. A display panel applied to the display device may generally include upper and lower substrates. The lower substrate may be provided therein with a data line, a gate line, and a thin film transistor (TFT). The upper substrate is bonded to the lower substrate to protect components provided on the lower substrate.

Meanwhile, referring to FIG. 17, the touch window may be provided under the driving part 600.

Meanwhile, referring to FIG. 18, a cover substrate 130 may be additionally provided on the touch window. The sensor part 200 of the touch window may be provided on a top surface of the substrate 100 (face up). An adhesive layer 700 may be interposed between the cover substrate 130 and the touch window.

Meanwhile, referring to FIG. 19, the touch window may be provided in the driving part 600. In detail, the driving part 600 may include upper and lower substrates 620 and 610, and the lower substrate 610 may be provided therein with a data line, a gate line, and a thin film transistor (TFT). The sensor part 200 may be formed on the lower substrate 610. The upper substrate 620 is bonded to the lower substrate 610 to protect components provided on the lower substrate 610. Meanwhile, a polarizer 630 may be provided on the upper substrate 620.

The touch window or the display device according to various embodiments may be applied to the touch device according to various embodiments.

The touch device according to the embodiment includes a screen section 10 and a peripheral section 20.

The touch device according to the embodiment may include a wearable display device. For example, as shown in FIG. 1, the touch device according to the embodiment may include a smart watch.

The screen section 10 is a part to display time or various pieces of information in the smart watch. In this case, the screen section 10 allows touch input.

The described-above touch window or display device according to various embodiments may be provided in the screen section 10 and the peripheral section 20.

In addition, a sensing electrode 800 may be provided in the screen section 10 to sense touch input. In detail, referring to FIG. 21, the sensing electrode 800 may include first and second sensing electrodes 810 and 820. The first and second sensing electrodes 810 and 820 may extend in directions different from each other.

Although FIG. 21 shows that the first and second sensing electrodes 810 and 820 are provided in the shape of a bar, the embodiment is not limited thereto. Accordingly, the first and second sensing electrodes 810 and 820 may be formed in various shapes such as a polygonal shape including a triangular shape or a rectangular shape, a circular shape, an oval shape, a diamond shape, an H-shape, and a mesh shape.

The first and second sensing electrodes 810 and 820 may include a transparent conductive material allowing electricity to flow without the interruption of light transmission. To this end, the first and second sensing electrodes 810 and 820 may include a metallic oxide, such as indium tin oxide, indium zinc oxide, copper oxide, tin oxide, zinc oxide, or titanium oxide. The first and second sensing electrodes 810 and 820 may include nanowire, a photosensitive nanowire film, a carbon nanotube (CNT), graphene, or various metals.

Although not shown in drawings, an insulating layer may be interposed between the first and second sensing electrodes 810 and 820. Accordingly, the electrical short between the first and second sensing electrodes 810 and 820 may be prevented. In addition, the first and second sensing electrodes 810 and 820 may be provided on different substrates, respectively, so that the first and second sensing electrodes 810 and 820 may be spaced apart from each other.

In the screen section 10, sensing may be performed through a capacitive touch scheme. In other words, the sensing electrode 800 may recognize the position of the touch through the capacitive touch scheme. In other words, if the input device such as a finger is touched on the screen section 10, the variation of capacitance occurs in the touched part by the input device, and the part having the variance of the capacitance may be sensed as the position of the touch.

Meanwhile, the peripheral section 20 is provided adjacent to the screen section 10. The peripheral section 20 may be a band to be put on the wrist of a user when the display device according to the embodiment is a smart watch. In this case, the peripheral section 20 may include the sensing part 21 to sense a touch.

The sensing part 21 may include a touch window or a display device according to various embodiments. In detail, the sensing part 21 may be provided therein with a touch window which can recognize a user touch and/or gesture through the TDR.

The touch window may include the substrate 100 and the sensor part 200 according to various embodiments. In other words, the sensor part 200 may have a pattern different from that of the sensing electrode 800.

Hereinafter, the sensor part 200 according to one embodiment will be described.

Referring to FIG. 22, the sensor part 200 may be provided on the entire surface of the sensing part 21. Sensor parts 200 may extend with mutually different directionalities. The sensor part 200 may include first and second sensor parts 410 and 420. The first sensor part 310 may extend in the first direction. The second sensor part 420 may extend in the second direction crossing the first direction. The first and second sensor parts 410 and 420 may be formed integrally with each other.

The sensor part 200 may include a transparent conductive material allowing electricity to flow without the interruption of light transmission. To this end, the sensor part 200 may include a metallic oxide, such as indium tin oxide, indium zinc oxide, copper oxide, tin oxide, zinc oxide, or titanium oxide. The sensor part 200 may include nanowire, a photosensitive nanowire film, a carbon nanotube (CNT), graphene, or various metals.

The sensing part 21 may perform a sensing process through a time domain reflectometry (TDR). The sensor part 200 may recognize the position of the touch through the TDR. In detail, referring to FIG. 4, the TDR is a scheme of sensing a touch point by analyzing a portion of a signal which is reflected from a point (touch point T) having great impedance to return as the signal is applied based on a transmission line theory to progress along the pattern of the sensor part 200. In other words, the input device can sense X and Y coordinates (2D) of the touch point using a signal formed above and below a threshold point in a time domain, which is provided due to impedance increase at the touch point. According to the related art, the TDR scheme is used to sense the disconnection of a cable.

In this case, the sensor part 200 includes one end 400a to generate AN energy pulse and an opposite end 400b to terminate the energy pulse as a signal is transmitted along the sensor part 200. The energy pulse is transmitted along an electrically conductive path (e.g., transmission line) having constant impedance. When the energy pulse reaches an unterminated end of the electrically conductive path or impedance varies along the electrically conductive path, a portion or the entire portion of the energy pulse is reflected toward the source of the energy pulse. If two metallic conductors are provided significantly closely to each other, two metallic conductors form a transmission line having characteristic impedance determined by the space and the dielectric between the metallic conductors. If the transmission line is terminated with the characteristic impedance thereof, a reflective pulse, which returns to the start point of the transmission line to generate the energy pulse, may not be generated. If the transmission line is unterminated, a positive reflective pulse may be generated as the transmitted energy pulse returns to the start point of the transmission line to generate the energy pulse. If impedance variation occurs at any place of the transmission line, the reflective pulse may be continuously generated and sensed. The return time of the reflective pulse to a pulse source position is used to determine a distance in which the impedance variation occurs. The increase of the capacitance along the transmission line (e.g., due to the touch by a finger) may make the transmission pulse having the returning reflective pulse a negative pulse.

Meanwhile, through the TDR scheme, a touch gesture as well as the position of the touch can be recognized. In other words, the touch gesture such as a drawing operation can be recognized in the sensing part 21. In addition, repeated touch gestures can be recognized in the sensing part 100. Therefore, a differentiated user interface can be provided, and user experience can be expanded.

Through the TDR scheme, the diameter of a touch tip can be reduced. In other words, as compared with a conventional capacitive touch scheme, the diameter of the touch tip can be reduced to a diameter in the range of 0.5 to 0.8. For example, the diameter of the touch tip may be reduced to 1Φ or less. Accordingly, the touch can be accurately recognized.

In addition, as compared with the conventional capacitive touch scheme, a touch sensing speed can be improved. In other words, the touch sensing speed may be increased to several microseconds (μs).

Meanwhile, according to the embodiment, although description is made in that the screen section 10 performs a sensing process through a capacitive touch scheme, and the sensing part 21 of the peripheral section 20 performs a sensing process through the TDR scheme, the embodiment is not limited thereto. Accordingly, both of the screen section 10 and the sensing part 21 may perform the sensing process through the capacitive touch scheme, or through the TDR scheme. In addition, the screen section 10 and the sensing part 21 may perform the sensing process through various schemes to sense the touch in addition to the two schemes.

Referring to FIG. 25, a display device according to another embodiment may include a wearable smart glass. In this case, the screen section 10 may serve as a lens, and the peripheral section 20 may serve as a glass frame. The sensing part 21 is provided on the glass frame to sense a touch. Meanwhile, although drawings show that the sensing part 21 is provided on the glass frame, the embodiment is not limited thereto. Accordingly, the sensing part 21 may be provided at various peripheral parts such as a bridge, a ring, and a top bar in the smart glass.

A touch function is provided to an opaque part as well as the transparent screen section 10 through the sensing part 21, so that the differentiation of a user interface can be ensured. In addition, the sensing part 21 includes a transparent material, so that the part having the sensing part 21 may be transparent.

FIGS. 26 to 36 are views to explain a touch device according to other embodiments.

Referring to FIG. 26, the touch device according to the embodiment includes a screen section 10 and a peripheral section 20 to surround the screen section 10.

The screen section 10 allows the input of a touch command by the user.

The screen section 10 may include a sensing electrode 800 to sense touch input. In detail, the sensing electrode 800 may be provided in the structure of FIG. 21.

In other words, the screen section 10 may perform the sensing process through the capacitive touch scheme. In other words, the sensing electrode 800 may recognize the position of the touch through the capacitive touch scheme. In other words, if an input device such as a finger is touched on the screen section 10, the variation of capacitance occurs in the touched part by the input device, and the part having the variance of the capacitance may be sensed as the position of the touch.

Meanwhile, the peripheral section 20 is provided adjacent to the screen part 10. The peripheral part 20 may be the rim of a smart phone screen when the display device according to the embodiment is a smart phone. In addition, the display device according to the embodiment may be applied to various display devices such as a TV and a navigation system.

In this case, the peripheral section 20 may include above-described touch windows according to the embodiment to sense touch. As shown in FIG. 22, the sensor part 200 employing a TDR scheme may be provided. Meanwhile, through the TDR scheme, a touch gesture as well as the position of the touch can be recognized. In other words, as shown in FIG. 26, the touch gesture such as a drawing operation can be recognized on the peripheral section 20. In addition, a touch gesture such as a sliding operation can be recognized. Accordingly, as shown in FIG. 27, a "swipe" function can be performed.

In addition, as shown in FIG. 28, a touch direction can be recognized in the peripheral section 20. Accordingly, the peripheral section 20 can recognize a clockwise direction or a counterclockwise direction.

In addition, as shown in FIG. 29, a touch gesture such as a dragging operation can be recognized in the peripheral section 20. Accordingly, a function of recognizing the touch gesture can be performed in a game using the dragging operation.

Further, as shown in FIG. 30, the peripheral section 20 may recognize repeated touch operations. For example, as shown in FIG. 31, a selecting touch function can be performed in the peripheral section 20.

The edge region of a conventional electronic appliance is limited to a button-type touch function due to the structural limitation of the electronic appliance. However, according to the embodiment, the limitation can be overcome. In other words, the differentiated user interface can be provided, and the experience of the user can be enlarged.

Through the TDR scheme, the diameter of a touch tip can be reduced. In other words, as compared with a conventional capacitive touch scheme, the diameter of the touch tip can be reduced to a diameter in the range of 0.5 to 0.8. For example, the diameter of the touch tip may be reduced to 1Φ or less. Accordingly, the touch can be accurately recognized.

In addition, as compared with the conventional capacitive touch scheme, a touch sensing speed can be improved. In other words, the touch sensing speed may be increased to several microseconds (μs).

Meanwhile, according to the embodiment, although description is made in that the screen section 10 performs a sensing process through a capacitive touch scheme, and the peripheral section 20 performs a sensing process through the TDR scheme, the embodiment is not limited thereto. Accordingly, both of the screen section 10 and the peripheral section 20 may perform the sensing process through the capacitive touch scheme, or through the TDR scheme. In addition, the screen section 10 and the peripheral section 20 may perform the sensing process through various schemes to sense the touch in addition to the two schemes.

Meanwhile, referring to FIGS. 32 and 33, the sensor part 200 may sense the touch pressure. The sensor part 200 may perform a pressure sensing process through a strain-gauge. The strain-gauge measures the change of a resistor by pressure using the variation of an electrical resistance value by applying the characteristic that the variation of the length of a resistor element is proportional to the variation of resistance. In other words, as shown in FIG. 11, when the length L1 of the sensor part 200 is extended by the pressure, the variation of the length can be measured using the variation of an electrical resistance value. In addition, as shown in FIG. 12, when the length L2 of the sensor part 200 is contracted, the variation of the length can be measured using the variation of the electrical resistance value.

Therefore, as shown in FIGS. 35 and 36, a realistic game can be driven based on pressure.

In other words, according to the embodiment, both of the position and the pressure of touch can be sensed through the same sensing electrode. In this case, the sensing electrode can perform each of functions of recognizing the position of the touch and the pressure of the touch regardless of the execution sequence of the functions. Accordingly, various user interfaces can be provided through the simple structure.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

Industrial Applicability

Since the touch window, the display device, and the touch device according to the embodiment can recognize the touch gesture as well as the touch position, the differentiated user interface can be provided, and the user experience can be expanded.

The invention claimed is:

1. A touch window comprising:
a substrate;
a sensor disposed on the substrate to perform a sensing process through a time domain reflectometry; and
a ground electrode adjacent to the sensor,
wherein the sensor comprises a conductive pattern,
wherein the conductive pattern comprises a conductive pattern opening and a conductive pattern line,
wherein the sensor comprises:
  a first sensor to receive a first signal; and
  a second sensor adjacent to the first sensor to receive a second signal,
wherein the ground electrode extends along the first sensor and the second sensor,
wherein the ground electrode is not electrically connected to the first sensor and the second sensor,
wherein the ground electrode comprises a first ground electrode, a second ground electrode and a third ground electrode, and
wherein the first sensor is disposed between the first ground electrode and the second ground electrode.

2. The touch window of claim 1, wherein the first sensor comprises a first sub sensor and a second sub sensor part having directionalities different from each other.

3. The touch window of claim 1, wherein, when a first point of the substrate is touched, variation of a first impedance occurs at a first point of the first sensor, variation of a second impedance occurs at a first point of the second sensor, and the first impedance is different from the second impedance.

4. The touch window of claim 1, wherein the first signal progresses in a first direction, and the second signal progresses in a second direction opposite to the first direction.

5. The touch window of claim 1, wherein the first signal progresses in a first direction, and the second signal progresses in a same direction as the first direction.

6. The touch window of claim 1, wherein a line width of the conductive pattern line is in a range of 0.1 μm to 10 μm.

7. The touch window of claim 1, wherein the ground electrode comprises a conductive pattern, and
wherein the conductive pattern of the ground electrode comprises a mesh pattern.

8. The touch window of claim 7, wherein the conductive pattern of the ground electrode and the conductive pattern of the sensor have a same shape.

9. The touch window of claim 1, further comprising:
a plurality of dummies interposed between winding portions of the first sensor or the second sensor,
wherein each of the plurality of dummies includes a conductive pattern made of a same material as the sensor for improving an optical characteristic of the touch window.

10. The touch window of claim 1, wherein the first sensor has a first winding pattern extending across a surface of the substrate, and the second sensor has a second winding pattern adjacent to the first winding pattern, extending across the surface of the substrate and having a similar shape as the first winding pattern,
wherein the first sensor is driven with the first signal progressing in a first direction, and the second sensor is driven with the second signal progressing in a second direction opposite to the first direction,
wherein the ground electrode includes two winding ground electrode patterns, and the first and second winding patterns are disposed between the two winding ground electrode patterns, and
wherein the first and second winding patterns and the two winding ground electrode patterns all have a similar shape and are separated from each other.

11. A touch device comprising:
a screen section;
a peripheral section to surround the screen section; and
a touch window in at least one of the screen section and the peripheral section,
wherein the touch window comprises:
  a substrate;
  a sensor on the substrate to sense a touch position or a touch pressure; and
  a ground electrode adjacent to the sensor,
wherein the sensor senses the touch position through a time domain reflectometry,
wherein the sensor includes a conductive pattern,
wherein the conductive pattern comprises a conductive pattern opening and a conductive pattern line,
wherein the sensor comprises:
  a first sensor to receive a first signal; and
  a second sensor adjacent to the first sensor to receive a second signal,
wherein the ground electrode extends along the first sensor and the second sensor,
wherein the ground electrode comprises a first ground electrode, a second ground electrode and a third ground electrode, and
wherein the first sensor is disposed between the first ground electrode and the second ground electrode.

12. The touch device of claim 11, wherein a length of the sensor changes based on a touch input.

13. The touch device of claim 11, wherein the sensor comprises:
a sensing electrode in the screen section; and
the sensor in the peripheral section, and
wherein the sensing electrode and the sensor have patterns different from each other.

14. The touch device of claim 11, wherein the sensor senses the touch pressure by a length variation of the sensor.

15. The touch device of claim 11, wherein the sensor is disposed on the screen section and the peripheral section.

16. The touch device of claim 11, wherein the sensor senses a touch gesture.

17. The touch device of claim 11, wherein the peripheral section is opaque.

18. The touch device of claim 11, wherein the sensor comprises a mesh pattern.

19. The touch device of claim 11, wherein the peripheral section is a rim of a smart phone screen when the touch device is applied to a display device.

* * * * *